(12) United States Patent
Presley et al.

(10) Patent No.: US 6,522,437 B2
(45) Date of Patent: Feb. 18, 2003

(54) AGILE MULTI-BEAM FREE-SPACE OPTICAL COMMUNICATION APPARATUS

(75) Inventors: Harry Presley, Malabar, FL (US); Michael O'Reilly, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 34 days.

(21) Appl. No.: 09/784,608

(22) Filed: Feb. 15, 2001

(65) Prior Publication Data

US 2002/0109884 A1 Aug. 15, 2002

(51) Int. Cl.[7] .......................... H04B 10/00; H04B 10/10
(52) U.S. Cl. ..................... 359/152; 359/159; 359/180
(58) Field of Search ..................... 359/663, 662, 359/619–626, 131, 152, 128, 159, 19, 27

(56) References Cited

U.S. PATENT DOCUMENTS

| | | | | |
|---|---|---|---|---|
| 4,705,367 A | * | 11/1987 | Eckbreth et al. | 219/121.75 |
| 5,095,380 A | * | 3/1992 | Kawai | 359/107 |
| 5,128,687 A | | 7/1992 | Fay | 343/754 |
| 5,404,247 A | * | 4/1995 | Cobb et al. | 359/662 |
| 5,475,520 A | * | 12/1995 | Wissinger | 342/354 |
| 5,517,016 A | | 5/1996 | Lesh et al. | 250/201.1 |
| 5,664,035 A | * | 9/1997 | Tsuji et al. | 359/152 |
| 5,677,697 A | | 10/1997 | Lee et al. | 342/368 |
| 5,710,652 A | | 1/1998 | Bloom et al. | 359/152 |
| 5,754,323 A | | 5/1998 | Rivers et al. | 359/152 |
| 5,786,923 A | | 7/1998 | Doucet et al. | 359/172 |
| 5,857,048 A | * | 1/1999 | Feuer et al. | 385/88 |
| 5,909,296 A | | 6/1999 | Tsacoyeanes | 359/152 |
| 5,959,578 A | | 9/1999 | Kreutel, Jr. | 342/373 |
| 5,966,399 A | | 10/1999 | Jiang et al. | 372/96 |
| 2001/0043381 A1 | * | 11/2001 | Green et al. | 359/172 |

FOREIGN PATENT DOCUMENTS

GB   WO 00/48338 A1 *  8/2000   ........... H04B/10/10

OTHER PUBLICATIONS

E. Brookner, "Atmospheric Propagation and Communication Channel Model for Laser Wavelengths", IEEE Transactions On Communication Technology, vol. COM–18, No. 4, Aug. 1970, pp 396–418.

* cited by examiner

Primary Examiner—Jason Chan
Assistant Examiner—Agustin Bello
(74) Attorney, Agent, or Firm—Allen, Dyer, Doppelt, Milbrath & Gilchrist, P.A.

(57) ABSTRACT

An electronically agile multi-beam optical transceiver has a first crossbar switch, that switches input signals to selected ones of a spatial array of light emitters. The light emitters supply modulated light beams to spatial locations of a telecentric lens, which geometrically transforms the beams along different divergence paths, in accordance with displacements from the lens axis of the light emitter elements within the spatial array. Light beams from remote sites incident on a divergence face of the telecentric lens are deflected to a photodetector array, outputs of which are coupled to a second crossbar switch. An auxiliary photodetector array monitors optical beams from one or more sites whose spatial locations are known, and supplies spatial error correction signals for real-time pointing and tracking and atmospheric correction.

4 Claims, 5 Drawing Sheets

FIG. 1.
(PRIOR ART)
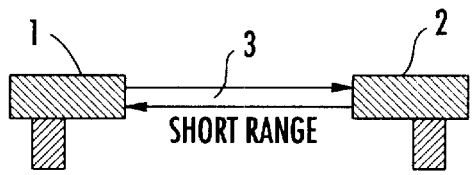
FIG. 2.
(PRIOR ART)
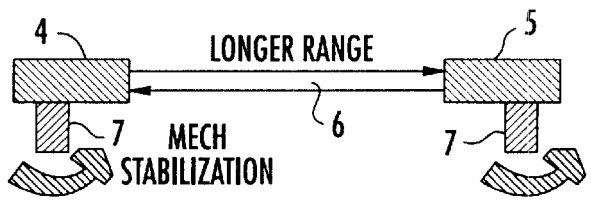
FIG. 3.
(PRIOR ART)
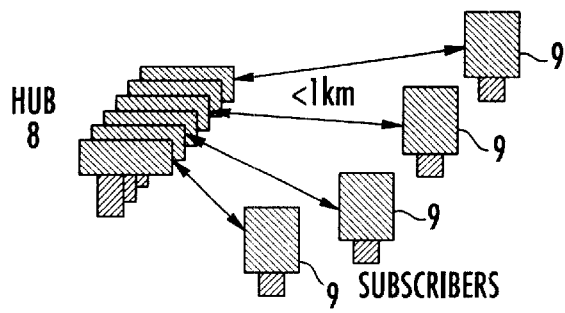
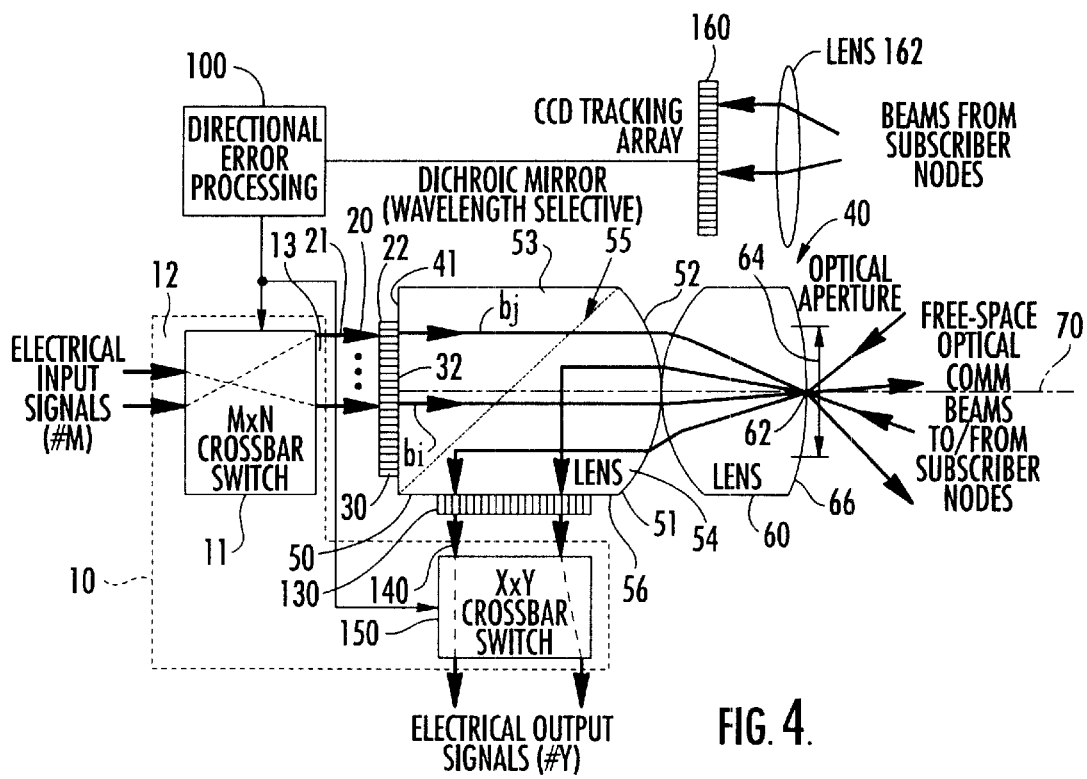
FIG. 4.

AGILE MULTI-BEAM FREE-SPACE OPTICAL COMMUNICATION APPARATUS

FIELD OF THE INVENTION

The present invention relates in general to optical communication systems, and is particularly directed to a new and improved, electronically agile, free-space optical communication apparatus, that is configured to provide for selectively directing each of a plurality of independent optical beams, such as those modulated with respectively different communication signals, through a common optical aperture in respectively different directions to a plurality of spatially diverse receiver sites.

BACKGROUND OF THE INVENTION

Currently available optical (e.g., laser-based) communication systems intended for free space applications, such as building-to-building local area networks and trunk extension systems, are customarily configured as (short range and long range) free space 'point-to-point' systems. As shown diagrammatically in FIGS. 1 and 2, such systems typically include local and remote optical (laser-based) transceiver pairs 1/2 and 4/5, each of which has an associated telescope for an aperture, and are optically coupled to one another over one or more line-of-sight optical links 3/6.

As further shown in FIG. 2, for long range applications in excess of a few km, some form of actively driven mechanical stabilization platform 7 is customarily used to maintain beam pointing. In addition, for point-to-point applications that are consistent with hub-spoke operation, the systems have a highly integrated configuration, such as that shown in FIG. 3, and require a substantial amount of hardware to provide multiple point-to-point links between a high power hub site 8 and a plurality of receiver (subscriber) sites 9. Unfortunately, none of these existing architectures addresses tactical applications or mobile nodes, nor do they provide for low cost point-to-multipoint communications.

SUMMARY OF THE INVENTION

In accordance with the present invention, advantage is taken of recent and emerging technology developments in free-space optical communications (FSOC), including economically produced dense arrays of addressable transmitter and receiver elements, to provide an lectronically agile multi-beam optical transceiver (or 'AMOX') for use in a point-to-multipoint hub, that allows any of multiple optical beams (independently modulated with respectively different communication signals), to be dynamically routed and spatially re-directed, as desired, in respectively different directions through a common optical aperture over a relatively wide field to a plurality of spatially diverse sites or nodes. The invention also includes a tracking array that actively corrects for pointing and tracking errors that may be due to relative node motions and atmospheric induced distortions. Being electronically agile, the invention has no moving parts, and thus achieves a reduction in size, weight, and cost, while improving reliability and functionality.

To this end, a multiport input-output unit contains an input crossbar switch, respective inputs of which are supplied with electronic signals, such as subscriber signals supplied by way of a digital telecommunication network. The crossbar switch's outputs are connected to respective transmitter driver circuits coupled to a (two-dimensional) array of light emitter (laser) elements, whose output beams are coupled to a telecentric lens system. For an integrated transceiver application, the telecentric lens system contains a frequency-selective (dichroic) interface that allows light at the transmission wavelength generated by the light emitter array to pass to and diverge from a convex face of the lens, whereas light incident upon the lens's convex face is reflected by the dichroic interface to an opto-electronic receiver array.

The telecentric lens performs a geometric transform of a beam from a spatial location of the transmit array along a path passing through a focal point within an aperture at the exit face of the lens diverges in accordance with the two-dimensional spatial displacement from the beam axis of its associated emitter within the transmitter array. This means that the desired travel path of an optical beam carrying a particular signal channel may be readily defined by controlling the crossbar switch feeding the two-dimensional transmitter array. Thus, the invention is able to project multiple transmit optical signals from a two-dimensional planar array of optical emitters into differentially divergent, free-space beams through a commonly shared aperture of the telecentric lens, with a precise relationship between the position of an emitter and it's angular transmit direction.

In the receive or return path direction, the telecentric lens accepts multiple receive optical beams and directs them onto a two-dimensional receiver array. The optics of the lens system produce a typical Fourier transform operation, and the focal plane positions correspond to unique angular beam directions. The photodetector array has its outputs connected to respective signal demodulators outputs of which are coupled to an receiver side crossbar switch, outputs of which are supplied to digital subscriber lines coupled to the transmit crossbar switch.

An auxiliary tracking (two-dimensional) photodetector array may be used to monitor one or more beams from nodes whose spatial locations relative to the hub site are precisely known. Any offset in the spatial location of a 'tracking' beam from such a node on the tracking array is used as an error correction signal by the control processor to impart the appropriate (X-Y) correction, as needed, in the steering commands supplied to the crossbar switches so as to provide for real-time pointing/tracking and atmospheric correction capability.

In some applications, the transmit and receive beams may be split between two spatially separate apertures, so that (transmit vs. receive) wavelength segregation is not necessary. Potential advantages of such beam division include larger receiver apertures for improved signal collection, optimization to specific transmit and receive array configurations, and a reduction in the complexity of diffractive optical elements or holographic optical elements.

The transmitter array may be implemented in a variety of ways. Where the number of remote nodes, which are generally spatially stable, is small, a sub-populated non-switchable or 'non-agile' array may be employed. An example of a 'non-agile' application involves the use of an Ethernet network to 'locally' connect buildings that are reasonably close to one another. A limited set of discrete laser sources may be hard-wired via an array of associated optical fibers to respective spatial locations within a light emitter array plane, for which the spatial-to-angular transform produced by the telecentric lens will direct the emitter beams along angular directions to subscriber nodes.

Although the invention may be applied to such 'non-agile' multi-beam terminals, the preferred embodiment of the invention employs the 'agile' configuration described above, in which any array position is potentially active and dynamically addressable. A non-limiting application of an agile array would be to allow mobile communication personnel to rapidly deploy a local area network (LAN), while providing for dynamic variations in the number and/or physical locations of the nodes of the network, and to track and correct for relative motion between the nodes.

To realize cost-effective, agile transmitter arrays, vertical cavity surface-emitting laser (VCSEL) components may be employed in combination with an M×N digital crossbar switch. Alternatively, the VCSELs may be replaced by discrete laser diodes in a sub-populated array. An advantage of VCSELs is their ability to simultaneously emit multiple transverse modes (MTMs). A multi-transverse mode source may reduce the effects of atmospheric scintillation in a FSOC link. With an MTM source, the beam is already somewhat homogenized, so that additional phase scrambling due to scintillation may be greatly reduced. This effect may also be generated or enhanced by using a custom-designed optical element to scramble the phase-fronts prior to transmission. As a non-limiting example, a DOE/HOE or a simple diffuser may be employed. This technique may also be used to produce the desired beam angle for the intended application.

As an alternative to electronic configurations, each crossbar switch may be implemented as an all-optical fiber optic switch. A principal advantage of an optical fiber approach is that the number of laser elements can be reduced to match the number of input signals. The transmit element array may comprise a fully populated fiber optic bundle, which can be configured and sized to have the desired element center-to-center spacing.

Although the transmitter array may comprise a spatially periodic, two-dimensional array of point-source emitters, the beams impinging upon the receiver array can be expected to be incident at arbitrary locations within the array depending on the angular position of subscriber nodes. The receiver array elements should therefore have the largest possible active area (up to the desired spatial resolution of the array) and the highest possible fill-factor (or very little dead space between photodetector elements). Also, the node connecting the detector, preamplifier, and feedback resistor components of a respective photodetector element must be relatively 'physically short' in order to preserve the receiver's bandwidth performance. In a two-dimensional receiver array, this node length may become unacceptable due to the loss of the second dimension for mounting components. The receiver array may be configured as a fiber bundle outputs of which are (optical-fiber) routed via a set of fiber optic switches to a subset of optimized discrete photodetectors.

BRIEF DESCRIPTION OF THE DRAWINGS

FIG. 1 diagrammatically illustrates a conventional short range, free space optical laser-based) communication system;

FIG. 2 diagrammatically illustrates a conventional long range, free space optical laser-based) communication system;

FIG. 3 diagrammatically illustrates hub/spoke-configured multiple point-to-point free space optical communication system;

FIG. 4 diagrammatically illustrates an (electronically) agile multi-beam optical transceiver in accordance with the invention;

DETAILED DESCRIPTION

Figure 5:
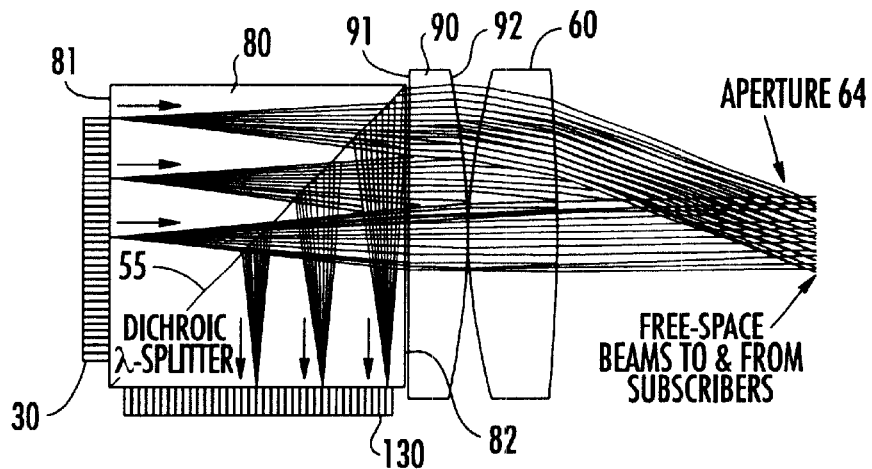
FIG. 5 shows an example of a telecentric lens configuration that may be used in the transceiver of FIG. 4.

A non-limiting embodiment of the multi-beam communication apparatus in accordance with the present invention, configured as an (electronically) agile multi-beam optical transceiver (AMOX) for use in a point-to-multipoint hub, is diagrammatically illustrated in FIG. 4 as comprising a multiport input-output unit shown in broken lines 10, that is coupled to receive electronic signals, such as those provided by way of a variety of signal transport paths, including (subscriber) signals supplied by way of a digital telecommunication network. As a non-limiting example, in the transmit direction, the input-output unit 10 may include an M input by N output crossbar switch 11 of the type typically installed as part of a telecommunication service provider's central office equipment.

The crossbar switch 11 serves to enable a signal applied to any input port of an array of M input ports 12 to be controllably electronically steered (by an associated control processor 100) to any output port of an array of N output ports 13. The N output ports 13 of the switch 11 are connected, in turn, to respective signal inputs 21 of a set of transmitter driver circuits 20, outputs 22 of which are coupled to signal inputs of an integrated array of light emitter elements 30. While the light emitter array 30 may comprise a 1×K array of elements, in a preferred embodiment for expanded volume multipoint transmission coverage, the light emitter array 30 is configured as a two-dimensional spatially array of light emitting elements (e.g., lasers), output beams of which have a prescribed optical transmission wavelength $\lambda_T$. As a non-limiting example, array 30 may comprise a laser emitter array available from Novalux Inc., Sunnyvale, Calif., having a substantially planar output surface 32, which facilitates intimately optically coupling the array with a substantially planar input face 41 of a telecentric lens system 40.

The telecentric lens system 40 may comprise a first lens element 50 having a first, substantially planar face 51 and a second, convex face 52 that is optically coupled with an adjoining second, convex-convex optical beam translating lens element 60. For the case of a two-dimensional light emitter array, the geometrical surfaces of the lens elements of the telecentric lens, that are intersected by an axis 70 orthogonal to the center of the laser element array 30, are surfaces of revolution, symmetric about the axis 70.

For the present transceiver example, the lens element 50 may be formed by bonding first and second lens block components 53 and 54 to a frequency-selective (dichroic) interface 55, that allows light at the transmission wavelength $\lambda_T$ generated by the light emitter element array 30 to pass through the interface 55 and exit the second, convex face 52, whereas light having a different receiver wavelength $\lambda_R$ as received by the face 52 from the lens element 60 is reflected by the lens' dichroic interface 55 towards a side face 56, to which an opto-electronic receiver array 130 is coupled. The receiver array preferably includes a front end normal-incidence bandpass filter. This filter, in conjunction with the wavelength selective dichroic mirror in the telecentric lens arrangement, is effective to efficiently filter background light from the received signals.

In an alternative configuration, the lens element 50 may be implemented as two sub-components, as shown at 80 and 90 in FIG. 5 (which illustrate transmit and receive beams associated with three duplex channels). In the telecentric lens configuration of FIG. 5, the first sub-lens component 80 is formed of two bonded components with a dichroic interface 55 therebetween, as in the architecture of FIG. 4. The sub-lens component 80 has a first substantially planar face 81 to which the light emitter array 30 is coupled, and a second planar face 82 that adjoins an associated planar face 91 of the second sub-lens component 90. The sub-lens component 90 has a convex face 92 that is optically coupled with the adjoining convex-convex optical beam translating lens element 60.

As shown in FIG. 4, the telecentric lens arrangement 40 is effective to perform a geometric transform of an optical beam incident upon the generally planar surface 51 of the lens element 50, along a path passing through and diverging from a focal point 62 within an aperture 64 at the exit face 66 of the lens element 60. As shown in FIG. 5, the parameters of the lens system are such that the diameter of the aperture 64 is sufficient to accommodate spreading of each of the transmit beams from its respective emitter within the array 30. The transmit beams (having transmission wavelength $\lambda_T$) are de-focused to the desired amount of angular beam width by simply controlling the distance between the surface 51 to which the array 30 is coupled and the telecentric lens. This does not impact the steering direction of the beams.

The geometric transform performed by the telecentric lens is such that the angle α subtended by the travel path of a beam exiting the exit face 66 of the lens element 60, and diverging from the central beam axis 70 (which passes through the telecentric lens' focal point 62) is definable in accordance with the two-dimensional spatial displacement from the beam axis 70 of its associated emitter within the array 30. Thus, as shown in FIG. 4, a beam $b_i$ generated by a laser emitter within the array 30 that is relatively close to the axis 70 will undergo a smaller angle of divergence through the focal point 62 from the axis 70, than will a beam $b_j$ generated by a laser emitter that spaced farther away from the axis.

This means that the desired travel path of an optical beam carrying a particular signal channel may be readily defined by controlling the crossbar switch 11 feeding the two-dimensional light beam element array 30, so as to steer the signal from whichever one of the switch's input ports 12 to which it is applied, to that one of the switch output ports 13 whose associated light beam element in the light element array 30 produces the intended travel path—based upon the geometry parameters of the spatial separation-to-angular divergence transform, described above.

Namely, the invention is able to project multiple transmit optical signals from a two-dimensional planar array of optical emitters into differentially divergent, free-space beams through a commonly shared aperture of the telecentric lens, with a precise relationship between the position of an emitter and it's angular transmit direction. Conversely, in the receive or return path direction, the telecentric lens accepts multiple receive optical beams and directs them onto a two-dimensional receiver array. The optics of the lens system produce a typical Fourier transform operation, and the focal plane positions correspond to unique angular beam directions.

The received beams at a prescribed optical receiver wavelength $\lambda_R$, are preferably defocused, so that their spots on an opto-electronic receiver array 130 are appropriately larger than any dead spaces of the array. This defocusing obviates the requirement for diffraction-limited optical performance, so that lens components 90 and 60 may be implemented as a pair of simple spherical lenses.

As pointed out briefly above, for the point-to-multipoint transceiver application of the present example, the dichroic material-coated interface 55 of lens element 50 reflects light received by face 52 from the lens element 60 toward the side face 56, to which an opto-electronic receiver array 130 is coupled. As in the case of the transmitter array 30, although the light receiver array 130 may comprise a linear (1×J) array of hotodetector elements, it is preferably configured as a two-dimensional array of photodetector elements, having a sensitivity characteristic at optical receiver wavelength $\lambda_R$, different from the optical transmission wavelength $\lambda_T$.

As a non-limiting example, the photodetector array 130 may comprise a photodetector array from Sensors Unlimited Inc., Princeton N.J., having a substantially planar input surface 132, to facilitate intimately optically coupling the array with the substantially planar side surface 56 of the lens element 50. Where the transceiver application provides duplex communications with each remote site, the photodetector array 130 may have effectively the same size as the laser emitter array 30, so that its photodetector elements are readily aligned with the input beams directed thereon from the remote sites by the telecentric lens.

The photodetector array 130 has its signal output ports connected to respective signal inputs of a set of receiver demodulators 140, outputs of which are coupled to signal inputs of an X input by Y output crossbar switch 150. The output crossbar switch 150 may be configured complementary to the input crossbar switch 11, so that X=N and Y=M. As such, the output signals from the output crossbar switch 150 may be supplied to digital subscriber lines coupled to the transmit side crossbar switch 11 for the case of duplex communications. In a complementary sense to the transmit crossbar switch 11, the receiver crossbar switch 150 serves to enable a signal applied to any of X=N input ports 151 from the receiver demodulator circuitry 140 to be controllably electronically steered to any of its Y=M output ports.

Also shown in FIG. 4 is an auxiliary tracking (two-dimensional) photodetector array 160 coupled with an associated focusing lens 162. Array 160 may comprise a conventional charge-coupled device (CCD) receiver array. The outputs of the tracking array 160 are coupled to the control processor 100, which defines the spatial steering of the signal beams through its control of the crossbar switches 30 and 130, as described above. The auxiliary array 160 is used to monitor one or more beams from nodes whose spatial locations relative to the hub site are precisely known a priori. Any offset in the spatial location of a 'tracking' beam from such a node on the tracking array 160 is used as an error correction signal by the control processor to impart the appropriate (X-Y) correction, as needed, in the steering commands supplied by the control processor 100 to the crossbar switches 30 and 130, so as to provide for real-time pointing/tracking and atmospheric correction capability.

While the optical transceiver embodiment shown in FIGS. 4 and 5 may employ conventional spherical lenses, as described above, it should be realized that there may be significant cost and performance advantages in using other components, such as diffractive optical elements (DOEs) or holographic optical elements (HOEs), it being understood that the wavelength-dependent aspects of such elements must be taken into account in the course of configuring a two-wavelength transceiver system.

Also, although the AMOX architecture described above allows all of the transmit and receive beams to share a common aperture, this is not a functional necessity. In certain applications, it may be advantageous to split the transmit and receive beams between two spatially separate apertures, so that (transmit vs. receive) wavelength segregation employed in the embodiment of FIGS. 4 and 5 is not necessary. Potential advantages of such beam division include larger receiver apertures for improved signal collection, optimization to specific transmit and receive array configurations, and a reduction in the complexity of DOE/HOE's optical elements (where applicable).

Figure 6:
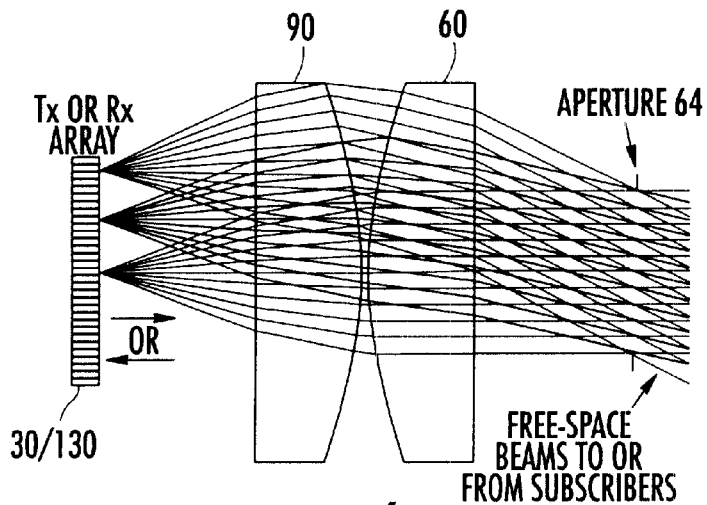
FIG. 6 depicts a telecentric lens configuration for a unidirectional terminal.

As shown in FIG. 6, an optical configuration for such a unidirectional terminal is similar to that shown in FIG. 5, except for the absence of a dichroic beam splitter, for a respective transmit or receive portion of an AMOX architecture. Here, the terminal serves as an adaptive multi-beam optical transmitter (AMOT) or an adaptive multi-beam optical receiver (AMOR). Whether implementing an AMOX, AMOT, or AMOR, the components of the optical system can be readily scaled to specific arrays and beam-forming requirements. A significant amount of flexibility is therefore available to accommodate a wide range of system applications including interdependent variations in field-of-regard (FOR), data rates, link ranges, etc.

Figure 7:
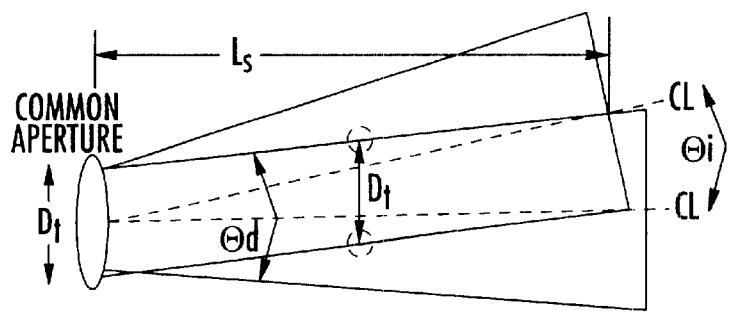
FIG. 7 is a beam-forming geometry diagram associated with a common aperture.

Regardless of whether an integrated transit/receive embodiment or a segregated transmit and receive embodiment is employed, the beams share a common aperture, so that there is a contiguous near-field beam coverage over the full FOR. In addition, as shown in the beam-forming geometry diagram of FIG. 7, where the angle $\Theta_i$ between adjacent transmitted beams is no more than the angular beam width $\Theta_d$ between (for example −3 dB beam edges), there will be a contiguous beam coverage in the far-field as well. The most efficient use of beam space occurs with $\Theta_i=\Theta_d$. In this case, neighboring beams become "resolvable" (e.g., centerlines are separated by one-half a beamwidth) at a distance of $L_s=D_t/\tan \Theta_i$.

Transmitter arrays for the above-described FSOC terminal may be implemented in a variety of ways. In a relatively simple application having only a small number of remote nodes, which are also generally spatially stable, sub-populated non-switchable arrays may be employed. A principal example of such a 'non-agile' application involves the use of an Ethernet network to 'locally' connect buildings that are in reasonably close proximity to one another.

Figure 8:
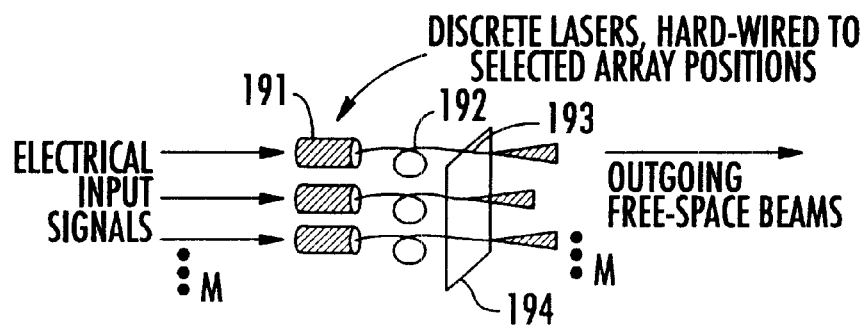
FIG. 8 diagrammatically illustrates a non-agile multi-beam optical transmitter for electrical input signals.
Figure 9:
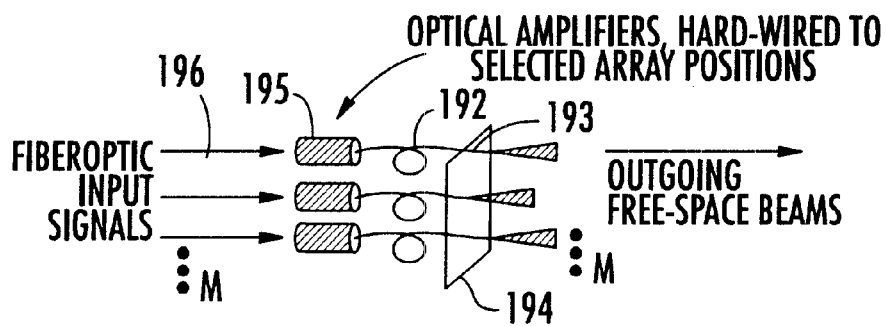
FIG. 9 diagrammatically illustrates a non-agile multi-beam optical transmitter for fiber optic input signals.

For such an application, a relatively limited set of discrete laser sources 191 are coupled to receive electrical input signals in the embodiment of FIG. 8 and optical input signals 196 to laser amplifiers 195 in the embodiment of FIG. 9. The outputs of the lasers may be hard-wired via an array of associated optical fibers 192 to respective spatial locations 193 within a light emitter array plane 194, for which the spatial-to-angular transform produced by the telecentric lens will direct the emitter beams along the desired angular directions of the subscriber nodes. A benefit of the fiber optic input embodiment of FIG. 9 is the fact that a respective input signal may require only optical amplification prior to being transmitting into free space. Optionally, the fiber optic array may comprise a fully populated fiber bundle, in which only specific fibers are connected to laser sources based on subscriber demand. In either case, M input data channels are specifically mapped to M output beam directions, as shown.

Although the invention may be applied to such 'non-agile' multi-beam terminals, the preferred embodiment of the invention employs the 'agile' configuration described above with reference to FIGS. 4–7, in which any array position is potentially active and dynamically addressable. A non-limiting application of an agile array would be to allow mobile communication personnel to rapidly deploy a local area network (LAN), while providing for dynamic variations in the number and/or physical locations of the nodes of the network, and to track and correct for relative motion between the nodes.

Figure 10:
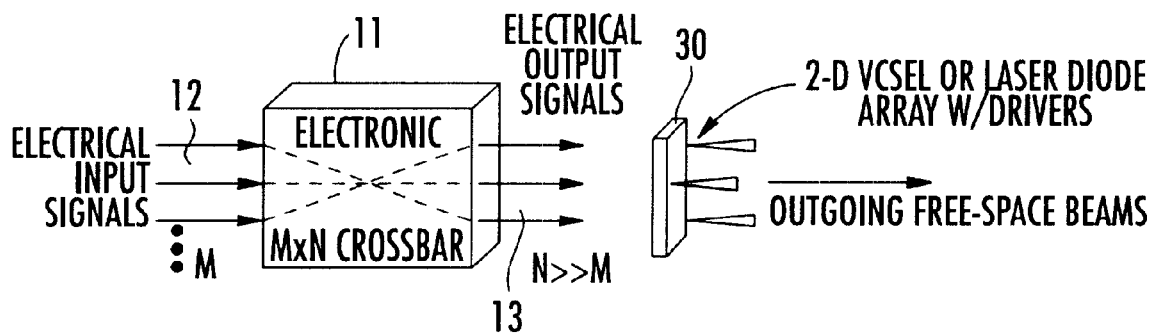
FIG. 10 shows an electronically agile transmitter array employing vertical cavity surface-emitting lasers coupled with a crossbar switch.
Figure 11:
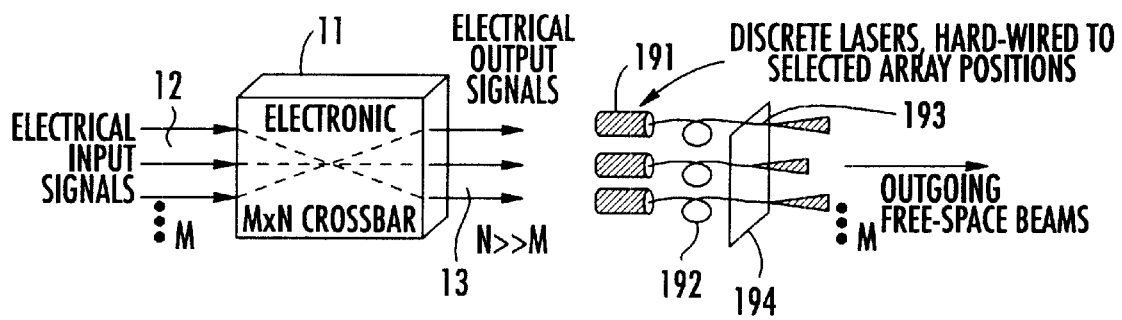
FIG. 11 shows an electronically agile transmitter array employing discrete laser diodes in a sub-populated array coupled with a crossbar switch.

In order to realize cost-effective, agile transmitter arrays, vertical cavity surface-emitting laser (VCSEL) components may be as the array 30 in combination with an M×N digital crossbar switch, as diagrammatically illustrated in the architecture of FIG. 10. Alternatively, as shown in the embodiment of FIG. 11, the VCSELs may be replaced by discrete laser diodes 191 in a sub-populated array, similar to the embodiment of FIG. 8. An advantage of using VCSELs is their ability to simultaneously emit multiple transverse modes. For reasons similar to the ability of a light-emitting diode (LED) to eliminate modal noise in a multi-mode fiber link, a multi-transverse mode (MTM) source may also significantly reduce the effects of atmospheric scintillation in a FSOC link.

Scintillation is the result of multi-path propagation in the atmosphere due to inhomogeneities in the index of refraction of air, causing the beam to temporally interfere with itself, both constructively and destructively. With an MTM source, however, the beam has already been somewhat "pre-scrambled" or homogenized, so the effects of additional phase scrambling due to scintillation may be greatly reduced, in comparison with problems that can occur with a single-transverse-mode source. This effect may also be generated or enhanced by using a custom-designed optical element to scramble the phase-fronts prior to transmission. As a non-limiting example, a DOE/HOE or a simple diffuser may be employed. This technique may also be used to produce the desired beam angle for the intended application, thereby efficiently accomplishing both objectives.

The M×N digital crossbar switches described above may be implemented in a variety of ways, such as, but not limited to application specific integrated circuits (ASICs), and logically controlled high-speed switches (LCHSSs). An ASIC implementation has several significant technical advantages, including very high packaging density (only one chip), reliability, and lower power requirements. However, in small quantities, ASICs may not be practical, due to their high set-up costs and the long continuing backlog at ASIC foundries. The LCHSS approach interconnects several high-speed digital switches to route the data signals and a field programmable gate array (FPGA), to control the configuration of the switches. This implementation is relatively low cost and can be packaged in a small volume.

The electrical bias of the laser emitters of the transmit array must also be individually controlled to maintain overall low power operation and to reduce the effects of heat buildup. For example, if a maximum of ten simultaneous transmit beams is employed, the emitters can be controlled with ten current sources, that are switched to the lasers via semiconductor switches and controlled by the same FPGA used to control the data switches.

Figure 12:
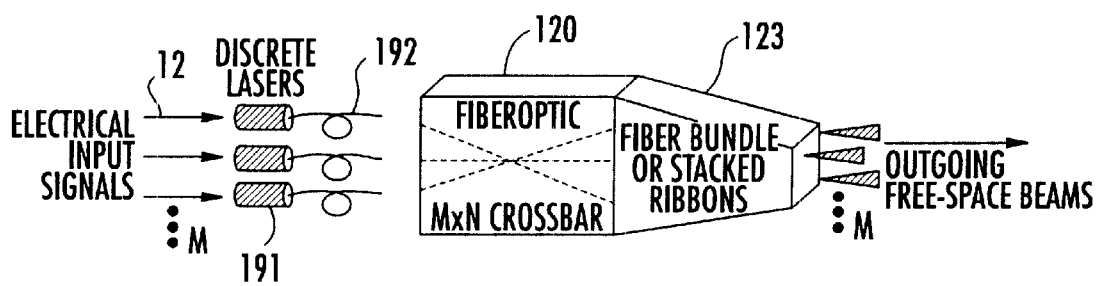
FIGS. 12 and 13 show respective transmitter arrays employing a fiber optic crossbar switch.
Figure 13:
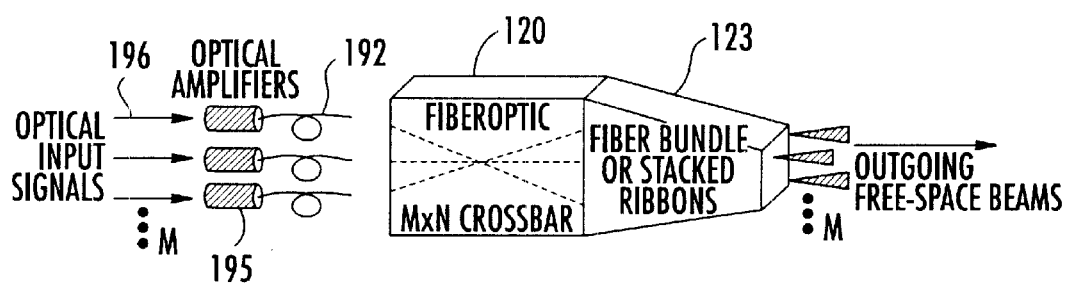

Alternatively, the crossbar switch may be implemented as an all-optical fiber optic switch, as diagrammatically illustrated at 120 in FIGS. 12 and 13. A principal advantage of an optical fiber approach is that the number of laser elements 191 (e.g., lasers having a transmit wavelength of 1550 nm) can be reduced to match the number of input signals. In the embodiments of FIGS. 12 and 13, a transmit element array 123 is formed of a fully populated fiber optic bundle, which can be configured and sized to have the desired element center-to-center spacing.

Consistent with point-to-multipoint (PMP) applications, preliminary link analyses have been performed to explore inter-related issues of data rate, link range, beam width, number of array elements, optical power, addressable field-of-regard (FOR), background optical noise, etc. The subscriber nodes in the PMP network are assumed to be single-channel (i.e., single laser, single detector). As such, they may employ collection apertures and transmit beam widths consistent with closing a duplex link with the multi-channel hub terminal in a conventional manner. As a non-limiting example, a fixed subscriber collection aperture of 6.0 inches may be assumed.

Figure 14:
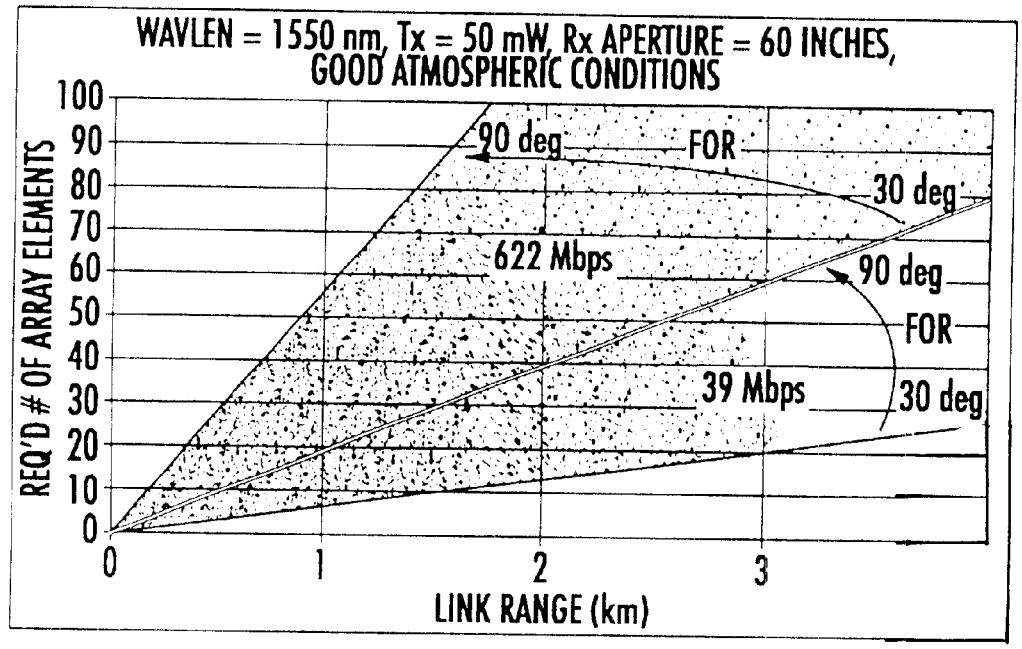
FIG. 14 shows an example of compiled results of link analyses for determining array size and addressable field-of-regard.

FIG. 14 shows an example of compiling the results of many link analyses to determine array size (number of required emitters) and addressable field-of-regard (FOR). In particular, FIG. 14 illustrates the number of array emitters required to cover FOR's ranging between 30° and 90° at data rates of 39 and 622 Mbps. For instance, to operate at a range of 1 km, a data rate of 622 Mbps, and a FOR of 30°×90°, the transmit array requires on the order of 20×60 emitter elements.

The receiver array generally requires a more complicated implementation than the transmitter array. Although, as described above, the transmitter array may comprise a spatially periodic, two-dimensional array of point-source emitters, the beams impinging upon the receiver array can be expected to be incident at arbitrary locations within the array depending on the angular position of subscriber nodes. The receiver array elements should therefore have the largest possible active area (up to the desired spatial resolution of the array) and the highest possible fill-factor (or very little dead space between photodetector elements).

In addition, the node connecting the detector, preamplifier, and feedback resistor components of a respective photodetector element must be relatively 'physically short' in order to preserve the receiver's bandwidth performance. In a two-dimensional receiver array, this node length may become unacceptable due to the loss of the second dimension for mounting components. To obviate this problem the detector's preamplifier may be co-mounted on the detector substrate. Alternatively, the receiver array may be configured as diagrammatically illustrated in FIG. 15, which shows the collection of the received beams on the end of a fiber bundle 125, the outputs of which are (optical-fiber) routed via a set of fiber optic switches 120 to a subset of optimized discrete photodetectors 127.

Figure 15:
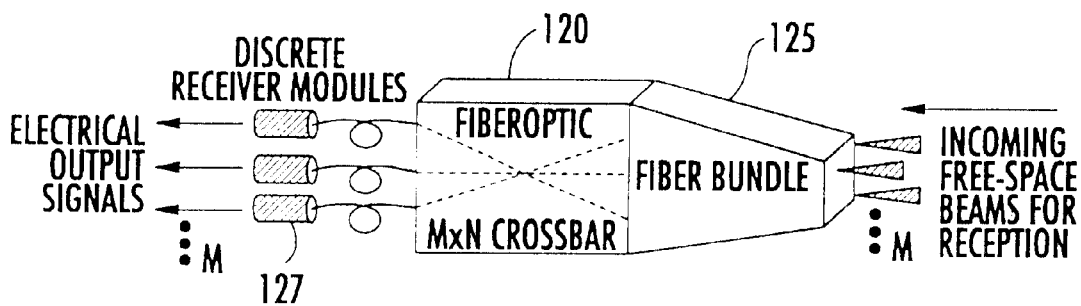
FIG. 15 shows an alternative embodiment of a receiver array.

This receiver architecture of FIG. 15 is essentially the inverse of the transmit array architecture of FIG. 12, described above. In order to achieve a high fill-factor, a respective optical fiber may contain a multimode core with a relatively thin cladding layer, such as a 100/125 micron core/cladding diameter. A 100 micron core provides a relatively good match to the active area of a high-performance photodetector operating in excess of 1 Gbps. The fibers from the bundle 221 can be physically 'fanned', as necessary, in order to interface with the fiber optic switch 223. High-density packaging of the receiver modules 223 can be enhanced by using integrated receiver arrays, which are currently commercially available in packages of up to 1×16 on a single substrate.

As will be appreciated from the foregoing description, the present invention takes advantage of current and emerging technology developments in free-space optical communications, to realize an electronically agile multi-beam optical transceiver for use in a point-to-multipoint hub. This agile transceiver allows any of multiple optical beams to be dynamically routed and spatially re-directed, in respectively different directions through a common optical aperture over a relatively wide field to a plurality of spatially diverse sites or nodes. In addition, a tracking array actively corrects for pointing and tracking errors that may be due to relative node motions and atmospheric induced distortions. Having no moving parts, the invention provides a reduction in size, weight, and cost, while improving reliability and functionality.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An electronically agile multi-beam optical transceiver comprising a first crossbar switch, having inputs thereof adapted to receive digital input communication signals, and outputs thereof selectively coupled to light emitter elements of a two-dimensional spatial array, that are operative to provide output beams conveying said digital input communication signals to a plurality of spatial locations of a telecentric lens system, said telecentric lens system being configured to perform a geometric transform of a respective one of said output beams, from a spatial location of said telecentric lens system, along a divergence path passing through a focal point lying on a lens axis in a lens aperture in accordance with spatial displacement from said lens axis of an associated light emitter within said two-dimensional spatial array, and wherein said telecentric lens system is configured to allow light beams at a transmission wavelength generated by said light emitter elements to pass to and diverge from a light beam diverging face of said telecentric lens system, and to deflect light incident at a receiver wavelength upon said light beam diverging face of said telecentric lens system to a photodetector array, outputs of which are coupled to a second crossbar switch from which digital output communication signals conveyed by light beams incident upon said light beam diverging face of said telecentric lens system at said receiver wavelength are derived.

2. An electronically agile multi-beam optical transceiver according to claim 1, further including an auxiliary array of photodetector elements arranged to monitor one or more optical beams from one or more sites whose spatial locations are known, and being operative to supply spatial error correction signals for controlling said first and second crossbar switches so as to provide for real-time pointing/tracking and atmospheric correction capability.

3. A method of performing point-to-multi-point communications for a plurality of first communication signals from a first communication site to a plurality of spatially diverse second communication sites, comprising the steps of:

(a) modulating respective ones of a plurality of optical beams with said first communication signals; and (b) selectively coupling said plurality of first optical beams to a plurality of spatial locations of a telecentric lens system, said telecentric lens system being configured to perform a geometric transform of a respective one of said first optical beams, from its spatial location of said telecentric lens system, along a beam divergence path passing through a focal point lying on a lens axis in a lens aperture, that diverges from said lens axis in accordance with said spatial displacement from said lens axis of said spatial location, and wherein step (b) comprises controllably coupling said first communication signals by way of a first crossbar switch to respective light emitter elements, said light emitter elements being operative to provide said first optical output beams conveying said first communication signals to selected spatial locations of said telecentric lens system, and wherein said telecentric lens system is configured to allow said first optical output beams at a transmission wavelength generated by said light emitter elements to pass to and diverge from a light beam diverging face of said telecentric lens system, and to deflect light incident at a receiver wavelength upon said light beam diverging face of said telecentric lens system to a photodetector array, outputs of which are coupled to a second crossbar switch from which digital output communication signals conveyed by light beams incident upon said light beam diverging face of said telecentric lens system at said receiver wavelength are derived.

4. A method according to claim 3, further including the steps of:

(c) monitoring by way of an auxiliary array of photodetector elements one or more optical beams from one or more sites whose spatial locations are known; and (d) supplying spatial error correction signals for controlling said first and second crossbar switches in accordance with outputs of said auxiliary array of photodetector elements.

* * * * *

UNITED STATES PATENT AND TRADEMARK OFFICE
CERTIFICATE OF CORRECTION

PATENT NO. : 6,522,437 B2
DATED : February 18, 2003
INVENTOR(S) : Harry Presley and Michael O'Reilly It is certified that error appears in the above-identified patent and that said Letters Patent is hereby corrected as shown below:

Column 1,
Line 47, delete "lectronically" insert -- electronically --

Column 2,
Line 30, delete "an" insert -- a --

Column 3,
Lines 53 and 56, delete "laser-based)" insert -- (laser-based) --

Column 5,
Line 54, delete "that spaced" insert -- that is spaced --

Column 6,
Line 25, delete "hotodetector" insert -- photodetector --

Column 8,
Line 6, delete "transmitting" insert -- transmitted --

Signed and Sealed this

Fifth Day of August, 2003

JAMES E. ROGAN
*Director of the United States Patent and Trademark Office*